UNITED STATES PATENT OFFICE.

WILLIAM BEECROFT BOTTOMLEY, OF LONDON, ENGLAND.

USE OF NITROGEN-FIXING ORGANISMS IN AGRICULTURE OR HORTICULTURE.

982,569. Specification of Letters Patent. Patented Jan. 24, 1911.

No Drawing. Application filed April 27, 1910. Serial No. 557,949.

*To all whom it may concern:*

Be it known that I, WILLIAM BEECROFT BOTTOMLEY, a subject of the King of Great Britain, residing at King's College, in the county of London, England, professor of botany, have invented certain new and useful Improvements Relating to the Use of Nitrogen-Fixing Organisms in Agriculture or Horticulture, of which the following is a specification.

For increasing the growth of leguminous plants pure cultures of nitrogen-fixing organisms, removed from the root tubercles of various leguminous plants, and known as *Pseudomonas radicicola*, have been used with success. Such cultures are, however, of no value for non-leguminous plants, and the attempt has been made to increase the growth of such plants by treating them with cultures of the aerobic organisms, known to fix free atmospheric nitrogen, which exist in ordinary cultivated soil. These organisms, called azotobacter, have proved, however, to have little or no effect in the desired direction.

I have discovered that a mixed culture of organisms containing pseudomonas and azotobacter has a very beneficial effect on non-leguminous plants, enhancing their growth to a considerable extent.

My invention consists in the application of this discovery and for this purpose I prepare a mixed culture of the organisms in question, and when desirable distribute the mixed culture through a suitable sterilized subdivided material for convenience of transport and application in agriculture and horticulture.

One mode of carrying out the invention consists in preparing on the one hand a pure culture of pseudomonas in any known manner, and on the other hand a culture of azotobacter, for instance by adding ordinary cultivated soil to a culture medium consisting of a solution in 1 liter of water of 20 grams of mannite, 1 gram of monobasic potassium phosphate and ½ gram of magnesium sulfate, to which ½ gram of calcium carbonate has been added, removing some of the brown scum which appears on the liquid in some 7 to 10 days and cultivating it on successive agar plates containing a culture medium of the foregoing composition. A drop removed with the usual bacteriological precautions from each culture is mixed with a little distilled water, and the mixture of organisms thus obtained is added to a culture medium which may consist for example of a solution in 1 liter of water of 15 grams of maltose, 10 grams of mannite, 1 gram of monobasic potassium phosphate and ½ gram of magnesium sulfate. When this medium, inoculated with the organisms is kept at 22°–28° C., the growth is rapid and will generally prove sufficient in from 36 to 48 hours. The milky liquid thus produced may be used for moistening seeds or it may be diluted with water and used for watering plants.

When the organisms are to be transported, finely sifted soil, ground peat or any like substance containing organic matter may be dried and sterilized and then impregnated with the milky liquid. The moistened material is then dried at a low temperature such as 30°–40° C., and after transport may be applied directly to the soil or mixed with water to yield a liquid for use as already stated. In some cases when it is desirable to transport a more concentrated form of the culture there is added to the culture medium in which the mixed organisms are to be grown about 2 per cent. of agar, so that a solid culture is produced.

Having thus described the nature of my said invention and the best means I know of carrying the same into practical effect, I claim:—

1. A method of increasing the growth of non-leguminous plants, which consists in treating them with a mixed culture of organisms obtained from the root tubercles of leguminous plants and aerobic organisms capable of fixing nitrogen and obtainable from the soil; substantially as described.

2. A method of increasing the growth of non-leguminous plants, which consists in treating them with a mixed culture of pseudomonas and azotobacter substantially as described.

3. A process of increasing the growth of non-leguminous plants, which consists in growing pseudomonas and azotobacter together in a medium containing maltose, mannite, monobasic potassium phosphate and magnesium sulfate and applying the mixed culture to the plants; substantially as described.

4. A process of producing a fertilizer for nonleguminous plants, which consists in preparing a pure culture of pseudomonas and a pure culture of azotobacter and mixing the pure cultures in a culture medium adapted for their joint reproduction.

In testimony whereof I have signed my name to this specification in the presence of two subscribing witnesses.

WILLIAM BEECROFT BOTTOMLEY. [L. S.]

Witnesses:
JOSEPH MILLARD,
WALTER J. SKERTEN.